Figure 1:
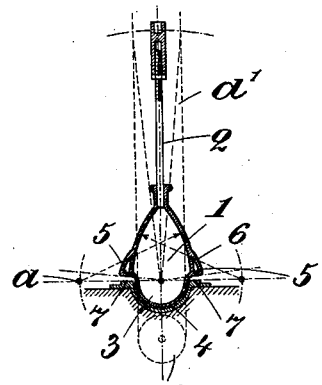

R. KOERNER.
SUPPORT FOR GYRATORY SIFTERS.
APPLICATION FILED JUNE 2, 1910.

1,098,042.

Patented May 26, 1914.

Witnesses.
W. Wallace Navin Jr
Geoffrey McD. Navin.

Inventor
Robert Koerner
By Julian C Dowell
his Attorney.

UNITED STATES PATENT OFFICE.

ROBERT KOERNER, OF BUDAPEST, AUSTRIA-HUNGARY.

SUPPORT FOR GYRATORY SIFTERS.

1,098,042. Specification of Letters Patent. Patented May 26, 1914.

Application filed June 2, 1910. Serial No. 564,727.

*To all whom it may concern:*

Be it known that I, ROBERT KOERNER, of Budapest, Austria-Hungary, a subject of the King of Prussia, and whose post-office address is Korall-Utcza 10, Budapest, Kingdom of Hungary, Empire of Austria-Hungary, have invented new and useful Improvements in Supports for Gyratory Sifters, of which the following is a specification.

Gyratory sifting machines have hitherto been attached either to suspended pendulums, or, in order to utilize the space above the sifting device have been mounted on the upper ends of vertical supporting pendulums.

The object of the present invention is to provide a ball joint or bearing for pendulum supports of gyratory machines, which ball joint, owing to its peculiar construction, prevents the pendulum support from tilting over to an undesirable extent.

The invention consists in providing one half of the joint with an annular supporting face, the other half or part of the joint having a counter-face serving as a race for the said supporting face, whereby the extent of movement has a determined limit, which can be exceeded only in the event of excessive tilting movements taking place, which are outside the normal working of the device. In order to prevent the pendulum from tilting over too far, in the latter case, the ball joint may be provided with special safety abutments, which are effective up to the limit of the breaking strain of the material.

Several constructional forms of ball joint embodying the present invention are shown in Figures 1 to 8 of the accompanying drawing in which like reference characters indicate like parts.

In the example shown in Fig. 1, the ball joint comprises the semi-spherical part 3, formed on the foot 1 of the pendulum 2, while the correspondingly shaped seat 4 is adapted to receive the ball in the usual manner. According to this invention, the upper portion of the ball 3 terminates in an annular supporting surface 5, which is formed by the lower surface of a cap 6, secured to or forming part of the foot 1 of the pendulum. Coöperating with the face 5, is a similar annular counterface 7, on the edge of the seat 4, and which forms the surface upon which the supporting face 5 rolls during working.

In order to insure a regular rolling of the supporting face during the normal amplitude of movement of the pendulum, the supporting face has a larger radius than the circle of oscillation $x$ of the pendulum, and the plane of the supporting face forms an angle with the horizontal plane equal to the angle $a'$ of the amplitude of movement of the pendulum. See dotted lines in Fig. 1.

Figure 2:
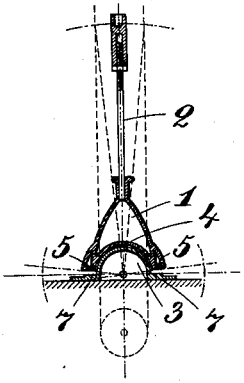
Figure 3:
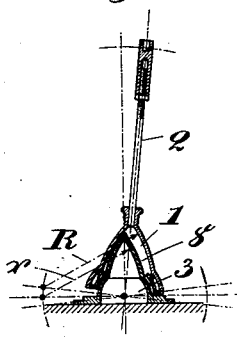
Figure 4:
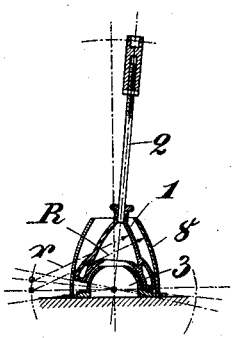
Figure 5:
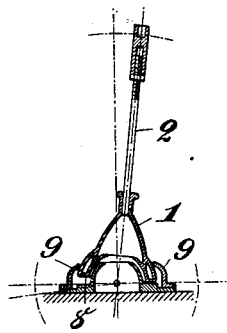

The constructional form shown in Fig. 2 is distinguished from the above example by the foot 1 of the pendulum being constructed in the form of a seat or cup 4, while the stationary part is in the form of a semi-sphere. In this modification, the supporting face 5 forms an annular extension of the cup 4 and the annular counterface 7 projects from the margin or edge of the ball 3.

Figure 6:
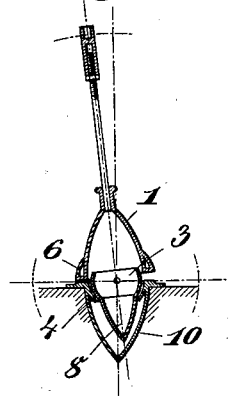
Figure 7:
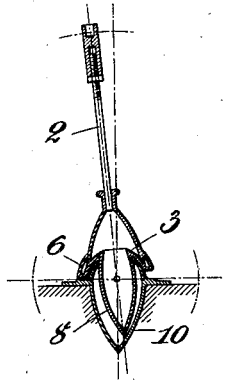
Figure 8:
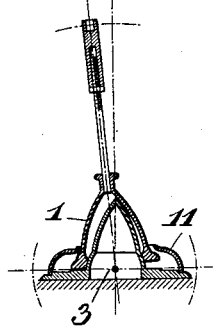

It often occurs during working that the sifter, particularly during starting or stopping, or when the load acts on one side, or in the event of the sifter striking or encountering an obstacle, is moved out of its regular path and consequently the upper joints of the pendulum exceed the regular or normal amplitude of movement, and therefore cause a tilting of the sifter about the outer edges of the supporting face 5. In order to avoid this, safety abutments are arranged, according to the present invention, as shown by way of example in several forms in Figs. 3 to 8. In the form illustrated in Fig. 3, the ball 3 is provided with an abutment or extension 8, projecting into the hollow foot 1 of the pendulum, and having an outer surface similar to the inner surface of the foot 1, only the radius of curvature $r$ of the extension 8 is smaller than the radius of curvature R of the inner surface of the foot 1. The difference in the length of these radii is so chosen that the pendulum is free to attain its regular amplitude of movement, but as soon as this is exceeded and the pendulum tends to tilt over, the inner face of the foot 1 strikes against the abutment 8 and thereby prevents undue tilting. In the constructional form shown in Fig. 4, an outer stationary abutment 8 is employed instead of an inner abutment, said outer abutment 8 surrounding the foot of the pendulum and forming an upward extension of the stationary part but acting in the same manner as the inner abutment previously described. In the example represented by Fig. 5, an extension of the supporting face is provided in the shape of an abutment ring 8 which coöperates with a surrounding stationary rim 9 for the same purpose. The construction shown in Fig. 6 is somewhat similar to that in Fig. 3, but in this case the ball or part sphere 3 is arranged at the foot of the pendulum and the abutment or extension 8 extends into a depending cavity 10 of the seat 4. The arrangement according to Fig. 7 is distinguished from the one just described by the ball or part sphere 3 being made hollow and provided with an extension 10 adapted to engage with the abutment 8. Finally Fig. 8 illustrates a pendulum, the supports of which are constructed similarly to Fig. 3, a special cap 11 being provided for the purpose of preventing the entrance of dust or other impurities.

The joint, according to the present invention, may of course be applied to the principal joint of the pendulum or to both ends thereof, and it may be constructionally modified in various ways without departing from the spirit of the present invention.

By the expression ball, it is to be understood that I include a circular surface constituted by a section of a sphere. It is also to be understood that the rolling of the supporting face hereinbefore mentioned is not a rotation of said face about its own axis but is a continuous regular shifting of the point of contact between the supporting face and the counterface, the annular distance between any point on one face and a point on the other face remaining unchanged.

What I do claim as my invention, and desire to secure by Letters Patent of the United States, is:—

1. A ball joint for gyratory supporting pendulums comprising stationary and gyratory part-spherical members, one member having an annular supporting rim and the other member having a counter-bearing surface upon which said rim rolls, the supporting rim forming an angle with the counter-bearing surface equal to the angle of amplitude of motion of the pendulum.

2. A ball joint for gyratory supporting pendulums comprising a part-spherical stationary member having a tapered extension, a hollow movable member adapted to have a circular rolling oscillatory motion about the stationary member and to engage against said extension to limit the amplitude of the motion, and means to prevent entrance of impurities between the two members.

3. A ball joint for gyratory supporting pendulums comprising a part-spherical stationary member having a tapering extension, a hollow movable member adapted to have a circular rolling oscillatory motion about the stationary member and to engage against said tapering extension to limit the amplitude of the motion, and an annular cap to prevent entrance of impurities between the two members.

In testimony whereof I have hereunto set my hand in presence of two subscribing witnesses.

ROBERT KOERNER.

Witnesses:
HUGH KEMÉNY,
CHARLES SCHUYLER.

Copies of this patent may be obtained for five cents each, by addressing the "Commissioner of Patents, Washington, D. C."